US012807129B2

(12) United States Patent
Delgado

(10) Patent No.: US 12,807,129 B2
(45) Date of Patent: Nov. 24, 2026

(54) ENGINE BRAKE ENERGY SINKING FOR REGENERATIVE BRAKING

(71) Applicant: PACCAR Inc, Bellevue, WA (US)

(72) Inventor: Brandon Delgado, Covington, WA (US)

(73) Assignee: PACCAR Inc, Bellevue, WA (US)

(*) Notice: Subject to any disclaimer, the term of this patent is extended or adjusted under 35 U.S.C. 154(b) by 96 days.

(21) Appl. No.: 18/906,348

(22) Filed: Oct. 4, 2024

(65) Prior Publication Data

US 2026/0097751 A1 Apr. 9, 2026

(51) Int. Cl.
*B60W 10/18* (2012.01)
*B60W 10/06* (2006.01)
*B60W 20/13* (2016.01)
*B60W 30/18* (2012.01)

(52) U.S. Cl.
CPC ............ *B60W 20/13* (2016.01); *B60W 10/06* (2013.01); *B60W 10/18* (2013.01); *B60W 30/18127* (2013.01); *B60W 30/18136* (2013.01)

(58) Field of Classification Search
None
See application file for complete search history.

(56) References Cited

U.S. PATENT DOCUMENTS 7,141,947 B2 11/2006 Pispa
7,311,163 B2 * 12/2007 Oliver .................. B60W 10/08 180/165
10,513,973 B2 * 12/2019 Kelly ...................... F02B 37/14
10,569,728 B2 * 2/2020 Martin .................... B60L 8/003
2001/0020554 A1 9/2001 Yanase et al.
2007/0068714 A1 * 3/2007 Bender .................... B60K 6/28 180/65.29

(Continued)

FOREIGN PATENT DOCUMENTS

DE 10 2010 045030 A1 3/2012
WO 2014/199810 A1 12/2014

OTHER PUBLICATIONS https://slideplayer.com/slide/14432904/ presentation retrieved on Jan. 8, 2024 (one page).

(Continued)

*Primary Examiner* — Hunter B Lonsberry
*Assistant Examiner* — Robert L Pinkerton

(57) ABSTRACT

Aspects of the present disclosure relate to systems and methods of extending regenerative braking functionality in a hybrid electric vehicle by providing engine brake energy sinking. In examples, engine brake energy sinking includes driving a generator connected to an internal combustion engine as a motor against an engine brake of the internal combustion engine. Power required to turn the generator against the engine brake may be generated through regenerative braking and is not limited to battery conditions. Thus, consistent braking torque may be applied by regenerative braking, where any excess recovered energy that cannot be absorbed by the vehicle's battery is dissipated by the engine brake. For instance, the excess recovered energy may be converted into kinetic energy and heat, where the heat may be dissipated by one or more cooling systems in use for the internal combustion engine and generator or used to heat one or more vehicle components.

19 Claims, 7 Drawing Sheets

(56) References Cited

U.S. PATENT DOCUMENTS

| | | | | |
|---|---|---|---|---|
| 2008/0215700 | A1* | 9/2008 | Pillar | B65F 3/045 709/212 |
| 2009/0298641 | A1 | 12/2009 | Boot et al. | |
| 2010/0305821 | A1 | 12/2010 | Huseman | |
| 2019/0217847 | A1* | 7/2019 | Hawley | B60W 30/18109 |
| 2021/0086623 | A1* | 3/2021 | Yao | B60W 30/18172 |
| 2024/0106242 | A1* | 3/2024 | Farb | F03D 7/0272 |
| 2024/0253635 | A1 | 8/2024 | Booth et al. | |

OTHER PUBLICATIONS

International Search Report and Written Opinion for International Patent Application No. PCT/US2025/049442 mailed Feb. 9, 2026, 16 pages.

* cited by examiner

ENGINE BRAKE ENERGY SINKING FOR REGENERATIVE BRAKING

BACKGROUND

Regenerative braking is a technology used in electric and hybrid electric vehicles where, during braking, the direction of the vehicle's electric motor's rotation is reversed to slow the vehicle (e.g., instead of or in addition to using the vehicle's service brakes). The electric motor may operate as an electric generator that recaptures kinetic energy to charge the vehicle's batteries. Regenerative braking provides various benefits, such as conserving energy, increasing driving range, reducing wear and maintenance of service brake components, etc.

Braking torque applied by regenerative braking may be limited at least in part by the amount of energy the batteries are able to absorb (e.g., state of charge and charge rate (charge/discharge rate)). Such factors vary during a drive cycle, which may cause the amount of available regenerative braking torque to vary unless any excess energy created by the regenerative braking can be otherwise dissipated. In some cases, the vehicle's service brakes are engaged to ensure safe and effective braking.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This disclosure generally relates to providing engine brake energy sinking for extending regenerative braking functionality in a hybrid electric vehicle. Systems and methods convert kinetic potential of an engine equipped with an engine brake into an electrical load. The electrical load may be used as a sink for energy generated through regenerative braking that is in excess of an amount of power that can be absorbed by the vehicle's battery system.

An aspect of the present disclosure includes a system for providing energy brake energy sinking in a hybrid electric vehicle, comprising: at least one processing unit; and a memory including instructions, which when executed by the at least one processing unit, cause the system to perform operations comprising: receiving an indication of a deceleration event; generating recovered electrical energy by applying regenerative braking; directing a portion of the recovered electrical energy to a battery; and directing a remainder of the recovered electrical energy to an engine brake.

Another aspect of the present disclosure includes a hybrid electric vehicle, comprising: a rechargeable battery; a drivetrain; an electric motor connected to the battery and the drivetrain; an internal combustion engine, wherein the internal combustion engine includes an engine brake; a generator, wherein the generator is connected to the rechargeable battery and to the internal combustion engine; and a system for providing energy brake energy sinking, comprising: at least one processing unit; and a memory including instructions, which when executed by the at least one processing unit, cause the system to perform operations comprising: receiving an indication of a deceleration event corresponding to a request for braking power; determining, an amount of negative torque to apply to the drivetrain by the electric motor to slow the hybrid electric vehicle based on the request for braking power; based on the determined amount of negative torque, determining a corresponding amount of electrical energy recoverable through regenerative braking; determining an absorption capacity of the battery; determining, based on a difference between the amount of electrical energy recoverable through regenerative braking and the battery's absorption capacity, an amount of excess recovered electrical energy; generating the amount of recoverable electrical energy through regenerative braking by running the electric motor in generation mode based on the determined negative torque; providing the amount of excess recovered electrical energy to the generator; and powering the internal combustion engine with the amount of excess recovered electrical energy by running the generator in motor mode.

Another aspect of the present disclosure includes a method for providing engine braking energy sinking in a hybrid electric vehicle, comprising: receiving an indication of a deceleration event corresponding to a request for braking power; determining regenerative braking is on; determine, an amount of negative torque to apply to a drivetrain by an electric motor to slow the hybrid electric vehicle based on the request for braking power; based on the determined amount of negative torque, determining a corresponding amount of electrical energy recoverable through regenerative braking; determining an absorption capacity of a battery; determining, based on a difference between the amount of electrical energy recoverable through regenerative braking and the battery's absorption capacity, an amount of excess recovered electrical energy; generating the amount of electrical energy recoverable through regenerative braking by running the electric motor in generation mode based on the determined negative torque; providing the amount of excess recovered electrical energy to a generator connected to an internal combustion engine including an engine brake; powering the internal combustion engine with the amount of excess recovered electrical energy by running the generator in motor mode; and sinking mechanical energy generated by the internal combustion engine by activating the engine brake.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
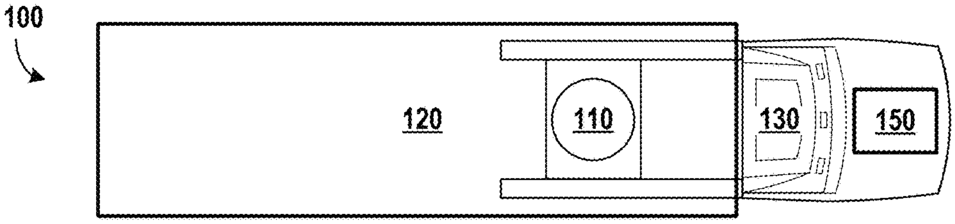
FIG. 1A is a diagram of a vehicle including an engine brake energy sink control system for providing engine brake energy sinking for regenerative braking according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

Currently, the amount of braking torque applied by regenerative braking may be limited to variations in state of charge and charge rate of the battery, unless any excess energy that cannot be stored by the battery is otherwise dissipated. For example, regenerative braking may not be available when the vehicle battery is above a threshold state of charge, or the energy created by regenerative braking must be dissipated. Further, variations in regenerative braking torque can lead to an unpredictable driving experience. In some examples, the issue of excess energy created by regenerative braking is mitigated via utilization of a braking chopper component that converts excess generated energy into heat through a resistive load bank. However, such a resistive load bank occupies space in the vehicle and may require additional cooling.

Aspects of the present disclosure relate to systems and methods of extending regenerative braking functionality in a hybrid electric vehicle by providing engine brake energy sinking. According to examples, engine brake energy sinking includes driving a generator connected to an internal combustion engine as a motor against an engine brake of the internal combustion engine. Power required to turn the generator against the engine brake may be generated through regenerative braking and is not limited by battery conditions. Thus, consistent braking torque may be applied by regenerative braking, where any excess recovered energy that cannot be absorbed by the vehicle's battery is dissipated by the engine brake. For instance, the excess recovered energy may be converted into kinetic energy and heat. In examples, the heat generated may be dissipated by one or more cooling systems already in use for the internal combustion engine and generator.

Figure 1B:
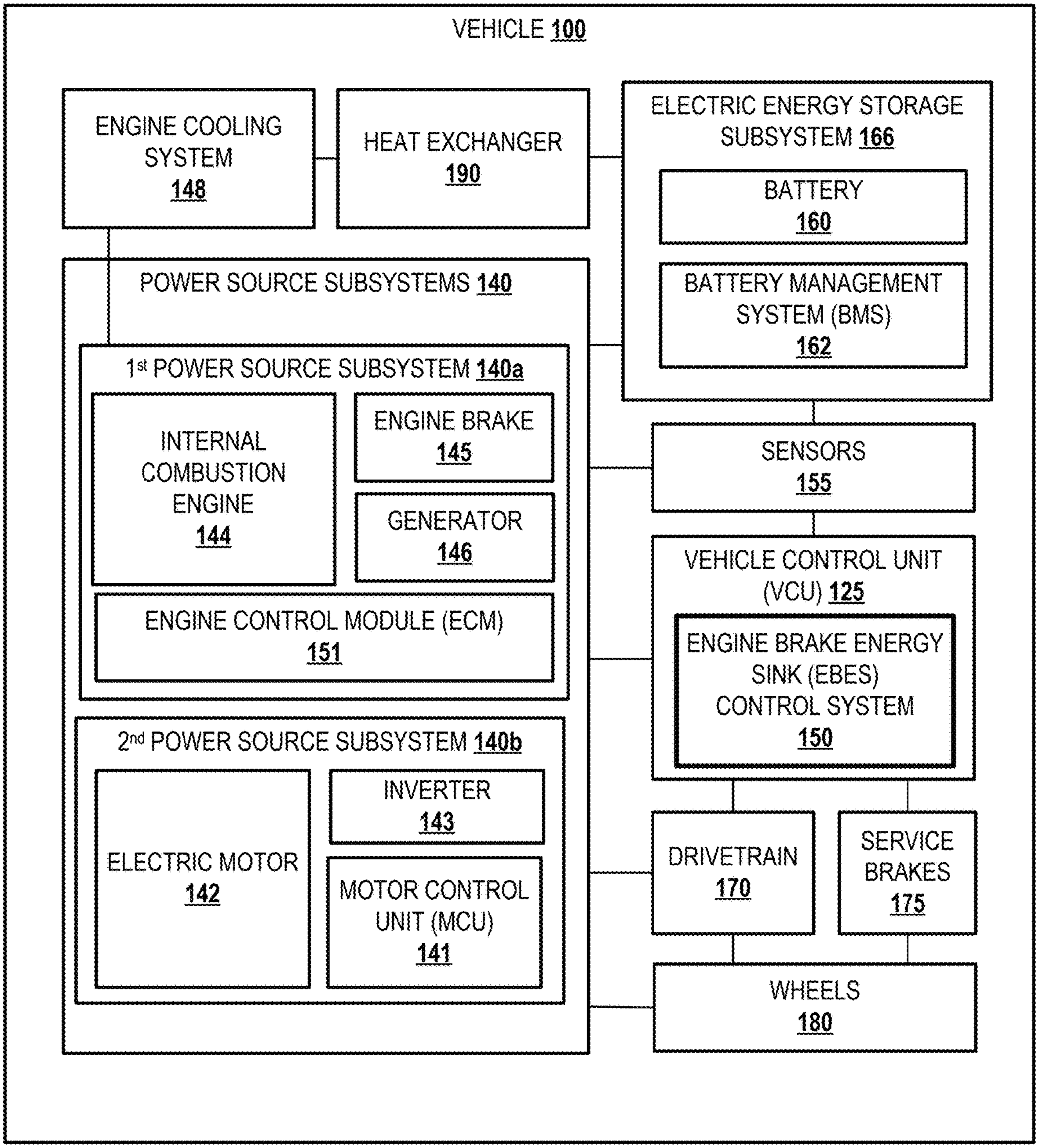
FIG. 1B is a diagram of a vehicle including an engine brake energy sink control system for providing engine brake energy sinking for regenerative braking according to an example.

FIGS. 1A and 1B depict a vehicle 100 including an engine brake energy sink (EBES) control system 150 for providing engine brake energy sinking for regenerative braking according to examples. In some implementations, the vehicle 100 is a truck, such as a Class 8 truck. The truck may be connected to a trailer 120 by a trailer coupling 110, such as, for example, a "fifth wheel," to form a tractor-trailer combination. However, the methods and systems can be used by vehicles 100 of different types and/or sizes. For instance, aspects of the disclosed subject matter may have wide application and, therefore, may be suitable for use with various types of vehicles 100, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter.

As shown in FIG. 1A, the vehicle 100 includes a cabin (referred to herein as a cab 130) attached to a frame where one or more occupants (e.g., an operator and passengers) may be seated or positioned and may be a primary zone where the operator interacts with various controls to drive the vehicle 100. In some examples, the cab 130 furthers include a sleeper compartment attached to the cab 130 that may provide various resting and sleeping accommodations for vehicle occupants.

As depicted in FIG. 1B, the EBES control system 150 is included as a function of a vehicle control unit (VCU) 125 configured to perform various vehicle control functions. The VCU 125 and EBES control system 150 may be implemented in a variety of hardware, software, and combined hardware/software configurations for carrying out aspects of the present disclosure. In examples, the EBES control system 150 may receive data from various sensors 155 (e.g., an acceleration input sensor, brake input sensor, and regenerative braking input sensor) and communicate with various electronic control units (ECUs) (e.g., a motor controller unit (MCU) 141, an engine control module (ECM) 151, and a battery management system (BMS) 162) via one or more communication protocols. The VCU 125 may include memory and a processor. In one embodiment, the memory comprises a random-access memory ("RAM") and an electronically erasable, programmable, read-only memory ("EEPROM"), or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor and implement functionality described herein.

The vehicle 100 includes a drivetrain 170 that receives power to propel the vehicle 100. The drivetrain 170 may include one or more drive shafts, differentials, and drive axles that connect to wheels 180 onto which tires are mounted that interact with a driving surface. The vehicle 100 may have one of various wheel, axle, and drive axle configurations (e.g., 6×4, 4×2, 8×4, 6×2). In examples, the vehicle 100 includes multiple power sources. According to examples, the power sources include a first power source subsystem 140*a* and a second power source subsystem 140*b* (collectively, power source subsystems 140) that interoperate to provide mechanical power to propel the vehicle 100 and/or charge one or more rechargeable batteries (collectively, battery 160) of an electrical energy storage subsystem 166. For instance, the vehicle 100 may be a hybrid electric vehicle (HEV), a parallel hybrid vehicle (PHEV), a series hybrid vehicle, a series/parallel hybrid, a range-extended electric vehicle (REEV), or have an alternative multi-power source configuration, where the electrical energy storage subsystem 166 stores received electrical energy in the battery 160. In examples, the electrical energy storage subsystem 166 includes the BMS 162, where the BMS 162 communicates with the VCU 125 to manage the battery 160. The BMS 162 may monitor the battery's state (e.g., State of Charge (SOC)), C rate (e.g., charge/discharge rate), and temperature) and communicate with the VCU 125 to report battery state data and control the charging and discharging of the battery 160. In some examples, as the charge of the battery 160 increases, the amount of power consumed by battery charging may decrease. For instance, as the battery 160 gets closer to its full charge capacity, the C rate may be decreased to help avoid overcharging the battery 160. In examples, the BMS 162 operates to protect the battery 160 from conditions that could damage it, such as overcharging, over-discharging, and/or overheating. In examples, the VCU 125 may make various decisions based on received battery state data.

In some implementations, the first power source subsystem 140*a* includes the ECM 151, which is in communication with the VCU 125 and controls operation of an internal combustion engine 144 and other components and functions of the first power source subsystem 140*a*. In examples, the internal combustion engine 144 generates mechanical power via combustion of a fuel. In some examples, the internal combustion engine 144 is mechanically coupled to a transmission through which the mechanical power generated by the internal combustion engine 144 is transmitted to the drivetrain 170 to drive the wheels 180. In further examples, the internal combustion engine 144 is selectively engaged and disengaged from the drivetrain 170 via a clutch, planetary gearset, or other power transfer mechanism. In examples, the first power source subsystem 140*a* further includes a generator 146 connected to the internal combustion engine 144 and the battery 160. In examples, the generator 146 may comprise an alternator (to convert mechanical energy from the internal combustion engine 144 into alternating current (AC)) and a rectifier circuit to convert the AC to direct current (DC). In examples, the battery 160 may comprise one or a plurality of batteries (e.g., a battery pack) that are electrically connected. In some examples, mechanical power generated by the internal combustion engine 144 is used to power the generator 146 to produce electricity, which is converted (e.g., from AC to DC and used to charge the battery 160. In other examples, electricity produced by the generator 146 is fed to one or more electric motors (collectively, electric motor 142).

In some implementations, the second power source subsystem 140*b* includes the MCU 141 in communication with the VCU 125 to control operation of the electric motor 142 and other components and functions of the second power source subsystem 140*b*. In some examples, the second power source subsystem 140*b* includes an inverter 143 that converts DC power from the battery 160 to AC power for the electric motor 142. The electric motor 142 uses the electricity supplied by the battery 160 and/or the internal combustion engine 144 to propel the vehicle 100. The electric motor 142 may work in conjunction with the internal combustion engine 144 to generate power. For instance, the internal combustion engine 144 may supplement power output of the electric motor 142 (e.g., to provide additional power or to provide efficient performance). In yet other examples, the vehicle 100 may operate in an electric-only mode, where the electric motor 142 may work independently to drive the wheels 180. The electric motor 142 may drive the wheels 180 directly (e.g., using in-wheel electric motors 142) or may transfer force to the wheels 180 via one or more drive axles.

In some implementations, the electric motor 142 further generates electrical energy (e.g., through regenerative braking) to charge the battery 160. In response to a deceleration event (e.g., the operator lifting off an accelerator pedal or applying pressure on a brake pedal, a cruise control system, autonomous driving system, assisted driving system, or other system or controller detecting a need to decelerate (to maintain a target speed, maintain stability, avoid a collision, or for energy management)) and when regenerative braking is engaged, the VCU 125 sends a command to the electric motor 142 to produce an amount of negative torque to be applied against the rotating wheels 180. For instance, resistance provided when operating the electric motor 142 in reverse as a generator (in generation mode) creates a braking torque, where the kinetic energy from the rotating wheels 180 is converted into electrical energy. In examples, the inverter 143 converts AC power generated by the electric motor 142 into DC power to charge the battery 160. The battery 160 may store this energy to later power the electric motor 142 for propulsion or to supply other onboard systems.

At various times throughout a drive cycle, regenerative braking may be limited by an amount of energy that can be absorbed by the battery 160. Various battery conditions, such as SOC, C rate, temperature, etc., may limit the amount of energy that the battery 160 can receive. When the battery 160 is near its maximum capacity, energy recovered through regenerative braking may not be able to be stored by the battery 160. Currently (without implementation of aspects of the present disclosure), the amount of regenerative braking torque available to be used may be reduced, and use of the vehicle's service brakes 175 may be increased to prevent excess electrical energy from being generated. In other previous solutions, brake resistors may be used to dissipate the excess energy produced by the regenerative braking; however, such brake resistors can be bulky and require separate cooling.

Implementation of aspects of the EBES control system 150 described herein includes providing engine brake energy sinking to dissipate excess energy recovered through regenerative braking. In examples, when regenerative braking is engaged, the EBES control system 150 determines an amount of regenerative braking torque needed to be supplied by the electric motor 142 to the wheels 180 to slow the vehicle 100 in response to the deceleration event. The EBES control system 150 further determines the amount of energy the electric motor 142 may recover through this process. In some examples, the amounts of applied regenerative braking torque and recovered electric energy depend on a selectable regenerative braking torque level.

According to examples, the EBES control system 150 communicates with the BMS 162 to obtain information about the battery's state (e.g., battery conditions: SOC, C rate, and temperature) and determines an amount of energy the battery 160 can receive. The EBES control system 150 further determines a difference between the amount of energy that may be recovered by the electric motor 142 and the amount of energy the battery 160 can receive. The difference is identified as excess recovered energy. According to examples, the EBES control system 150 sends a command to the generator 146 of the first power source subsystem 140*a* to operate in reverse as a motor (in motor mode) to power the internal combustion engine 144 and dissipate the excess recovered energy via engagement of an engine brake 145. The engine brake 145 is a system that uses the internal combustion engine 144 to create a resistive force that can help slow down the vehicle 100 and/or sink mechanical energy generated by using the internal combustion engine 144 to consume the excess recovered energy from regenerative braking. In some implementations, the engine brake 145 is a compression release brake (e.g., used with a diesel or natural gas engine) that operates by opening exhaust valves at the end of the compression stroke, thus releasing the compressed air in the cylinders before it can push the pistons back down. For instance, the internal combustion engine 144 may operate as an air compressor, dissipating kinetic energy as heat. In other implementations, the engine brake 145 is an exhaust brake that restricts a flow of exhaust gases exiting the internal combustion engine 144, creating back pressure in the exhaust system that increases resistance against the pistons' movement during the exhaust stroke. Thus, rather than varying the braking torque applied by regenerative braking depending on battery conditions, the EBES control system 150 provides consistent regenerative braking torque by using the internal combustion engine 144 as an energy sink for the recovered energy in excess of the amount that can be absorbed by the battery 160. In some implementations, such as when the first power source subsystem 140*a* is connected to the drivetrain 170, the engine brake 145 may be used to augment regenerative braking. For instance, the EBES control system 150 may determine an amount of braking torque (e.g., 0-100%) to be applied by the engine brake 145 and communicate a request for the determined amount to the ECM 151. The first power source subsystem 140*a* may be sized according to the application of engine brake energy sinking to ensure that the energy sink provided by the first power source subsystem 140*a* is sufficient to handle a maximum amount of energy recovered from regenerative braking by the second power source subsystem 140*b*.

Figure 2:
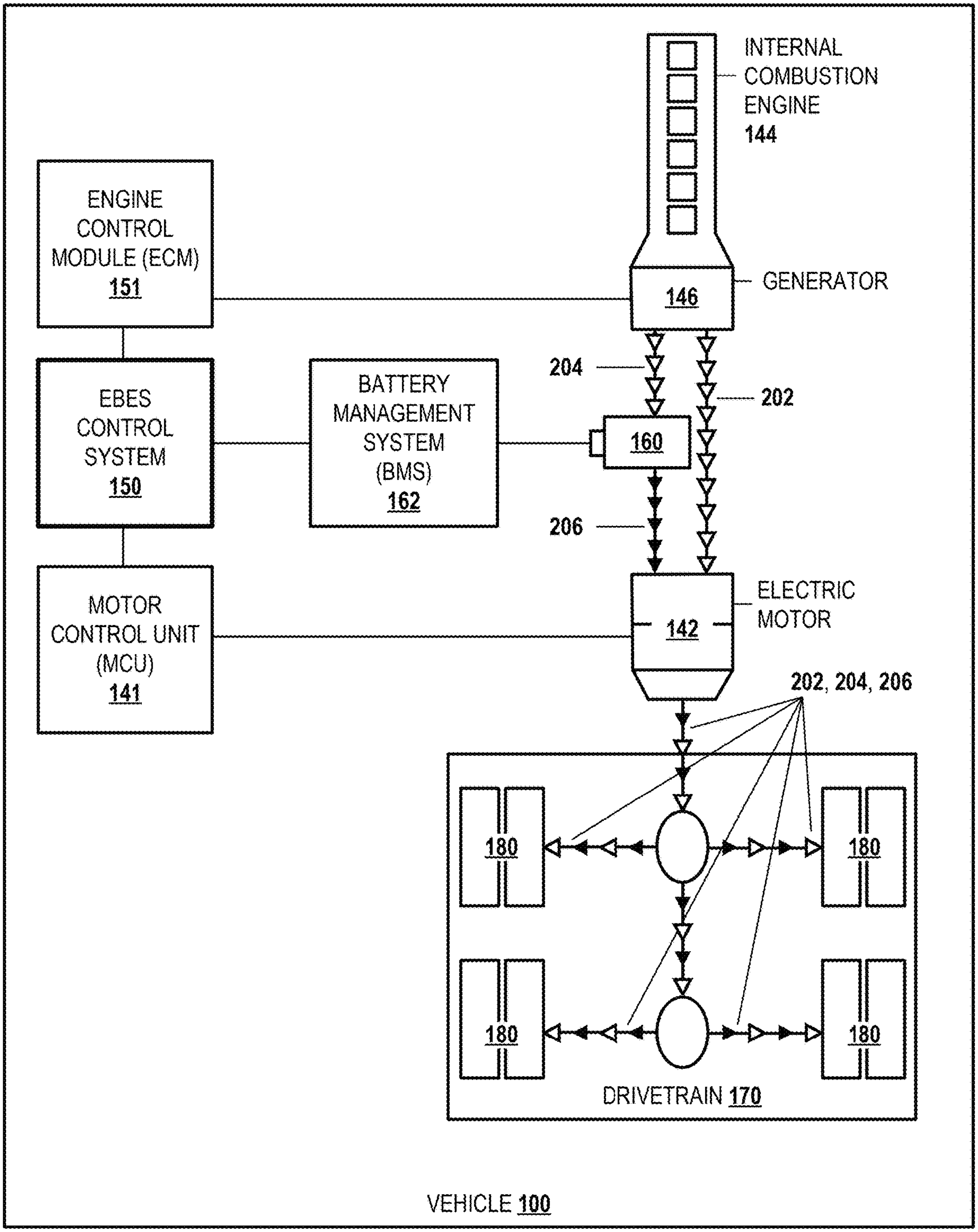
FIG. 2 is a diagram depicting a use case of using energy to power the vehicle of FIGS. 1A and 1B in response to an indication of a throttle request according to an example.

With reference now to FIG. 2, an example use case is depicted, where a throttle request to move the vehicle 100 may be received by the VCU 125 (e.g., from the operator, a cruise control system, autonomous driving system, assisted driving system, or other system or controller). In some examples, a first control state may be determined by the VCU 125, such as operating the generator 146 in generation mode to supply power to drive the vehicle 100. For instance, and as indicated by a first set of arrows 202 depicted between the generator 146 (of the first power source subsystem 140*a*) and the electric motor 142 (of the second power source subsystem 140*b*), in the first control state, the generator 146 may be driven by the internal combustion engine 144 and supplies power to the electric motor 142. In examples, the electric motor 142 may operate in drive mode to drive the wheels 180 using the supplied power from the internal combustion engine 144 in response to the throttle request. According to another example, and as indicated by a second set of arrows 204, the generator 146 may further charge the battery 160 (e.g., when required to maintain SOC). According to another example (not depicted in FIG. 2), the internal combustion engine 144 may directly power the drivetrain 170 to drive the wheels 180 (e.g., in conjunction with or independently of the electric motor 142).

In some examples, a second control state may be determined by the VCU 125, which is indicated by a third set of arrows 206 depicted between the battery 160 and the electric motor 142. According to an example, in the second control state, energy stored by the battery 160 is used to help power the electric motor 142, which in drive mode, drives the wheels 180. This is sometimes referred to as battery assist and may be used in such cases where the throttle request requires the electric motor 142 to use more power than the generator 146 can supply or where the preference is to use battery power rather than calling for power from the internal combustion engine 144. Use of battery assist may deplete the battery's charge. Thus, when the demand to power the electric motor 142 is low, the generator 146 may be used to recharge the battery 160 (indicated by the second set of arrows 204). This recharging may occur during one or more periods of lower throttle demand (e.g., steady-state cruising or when the vehicle 100 is idling) to ensure that the battery 160 is adequately charged for when additional power is needed again. In another example, a third control state may be implemented, where the electric motor 142 and the internal combustion engine 144 work in tandem to provide power output. In examples, the VCU 125 may monitor the SOC of the battery 160 and adjust the operating modes as determined based on various factors.

Figure 3:
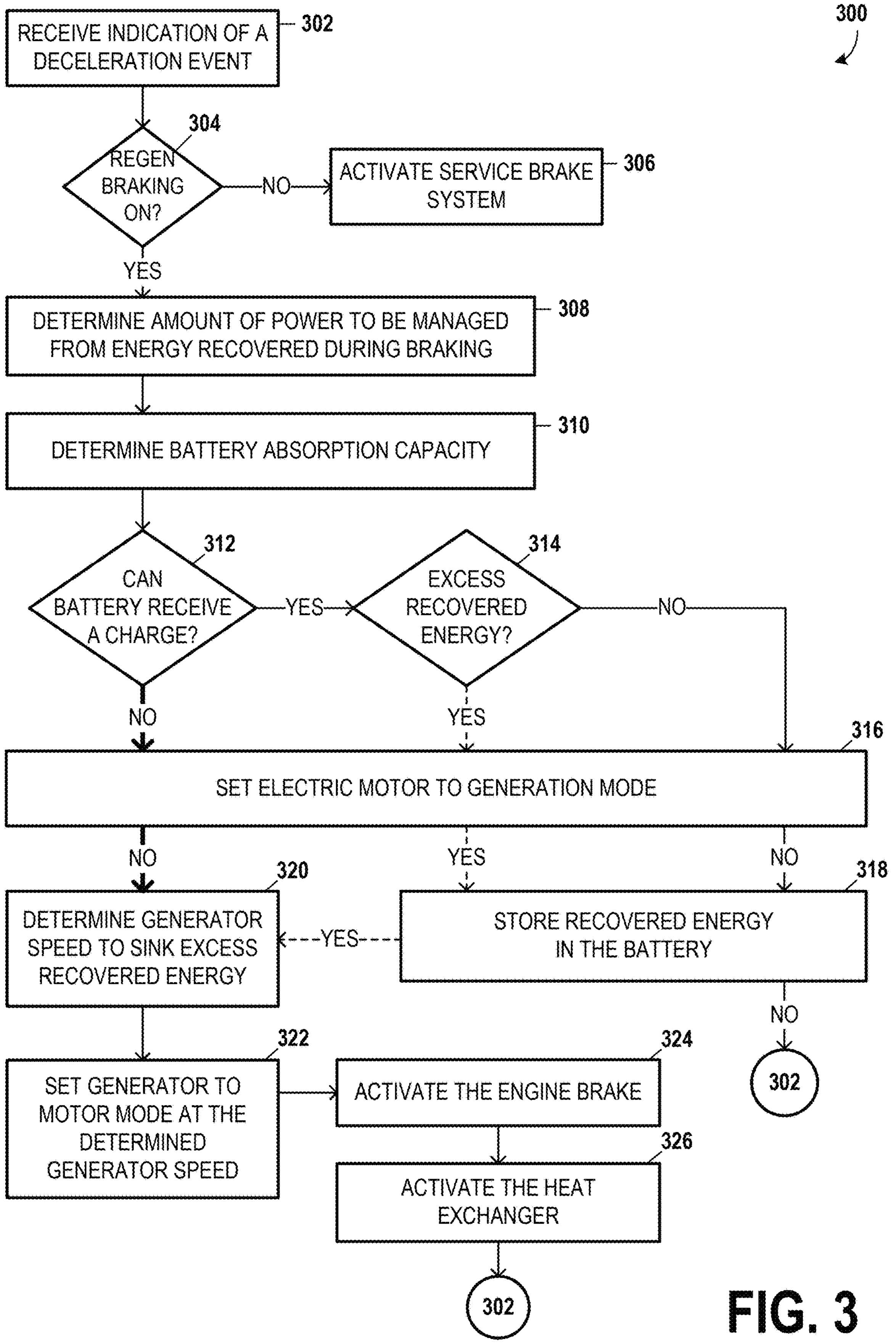
FIG. 3 is a flow diagram of an example method for providing engine brake energy sinking for regenerative braking according to an example.

With reference now to FIG. 3, a flow diagram is depicted including operations of a method 300 for providing engine braking energy sinking according to an example. At operation 302, an indication of a deceleration event (e.g., a brake request) is received. In some examples, the EBES control system 150 receives a signal corresponding to an operator of the vehicle 100 disengaging an accelerator pedal and/or pressing a brake pedal or an automated system (e.g., a cruise control system, autonomous driving system, assisted driving system, or other system or controller) detecting a need to decelerate (e.g., to maintain a target speed, maintain stability, or avoid a collision).

At decision operation 304, a determination is made as to whether regenerative braking is on/engaged. For instance, the vehicle 100 may provide an option for allowing the operator to turn off/disengage regenerative braking. When a determination is made that regenerative braking is not on/engaged, the vehicle's service brakes 175 may be engaged at operation 306 to slow down the vehicle 100.

Alternatively, when a determination is made at decision operation 304 that regenerative braking is on/engaged, the method 300 proceeds to operation 308, where a determination is made as to an amount of power to be managed from energy captured from responding to the deceleration event. In some examples, the EBES control system 150 may determine an amount of recovered energy from regenerative braking based on an amount of regenerative braking torque needed to be supplied by the electric motor 142 to the wheels 180 to slow the vehicle 100 and a selected regenerative braking torque level.

The amount of regenerative braking torque may be determined based on various sensor readings, such as corresponding to vehicle speed, deceleration rate, brake and/or accelerator pedal positions, gradient of the road, weight of the vehicle 100, environmental conditions (e.g., weather, road surface conditions), etc. In some examples, the vehicle 100 may provide an option that allows the operator to choose from different levels of regenerative braking torque (e.g., low, medium, or high, or any specific amount). In some examples, the different levels correspond to different torque amounts of the electric motor 142. For example, at a low setting (33%), the electric motor 142 may operate at 33% of its maximum torque, at a medium setting (66%), the electric motor 142 may operate at 66% of its maximum torque, and at a high setting (100%), the electric motor 142 may operate at its maximum torque. The regenerative braking capacity level may be adjusted dynamically, either manually by the operator (e.g., via operator controls on a display, dashboard, or steering wheel) or, in some implementations, automatically by the VCU 125. In examples, the level(s) of regenerative braking torque may be selected with high granularity (e.g., a sliding scale from 0% to 100%) that may be user controlled (e.g., by providing a user interface element, such as a slider or dial, that permits selection at a high level of accuracy) or programmatic (e.g., by receiving, from an autonomous driving control system or other vehicle control system, an exact desired level of regenerative braking torque to be provided).

The method 300 may proceed to operation 310, where a determination is made as to the battery's absorption capacity. In some examples, the EBES control system 150 may communicate with the BMS 162 to obtain information about the battery's state (e.g., battery conditions: SOC, C rate, and temperature). For instance, based on the obtained information, the EBES control system 150 may determine an amount of energy that can be stored in the battery 160 without exceeding its absorption capacity.

At decision operation 312, a determination is made as to whether the battery 160 is able to receive a charge. For instance, when the obtained battery state information indicates the battery 160 is not fully charged and has at least some capacity to absorb recovered energy, a determination may be made that the battery 160 can receive a charge. When a determination is made that the battery 160 can receive a charge, the method 300 may continue to decision operation 314, where a determination is made as to whether there is excess recovered energy to manage (e.g., an amount of energy recovered that the battery 160 cannot receive).

Figure 4:
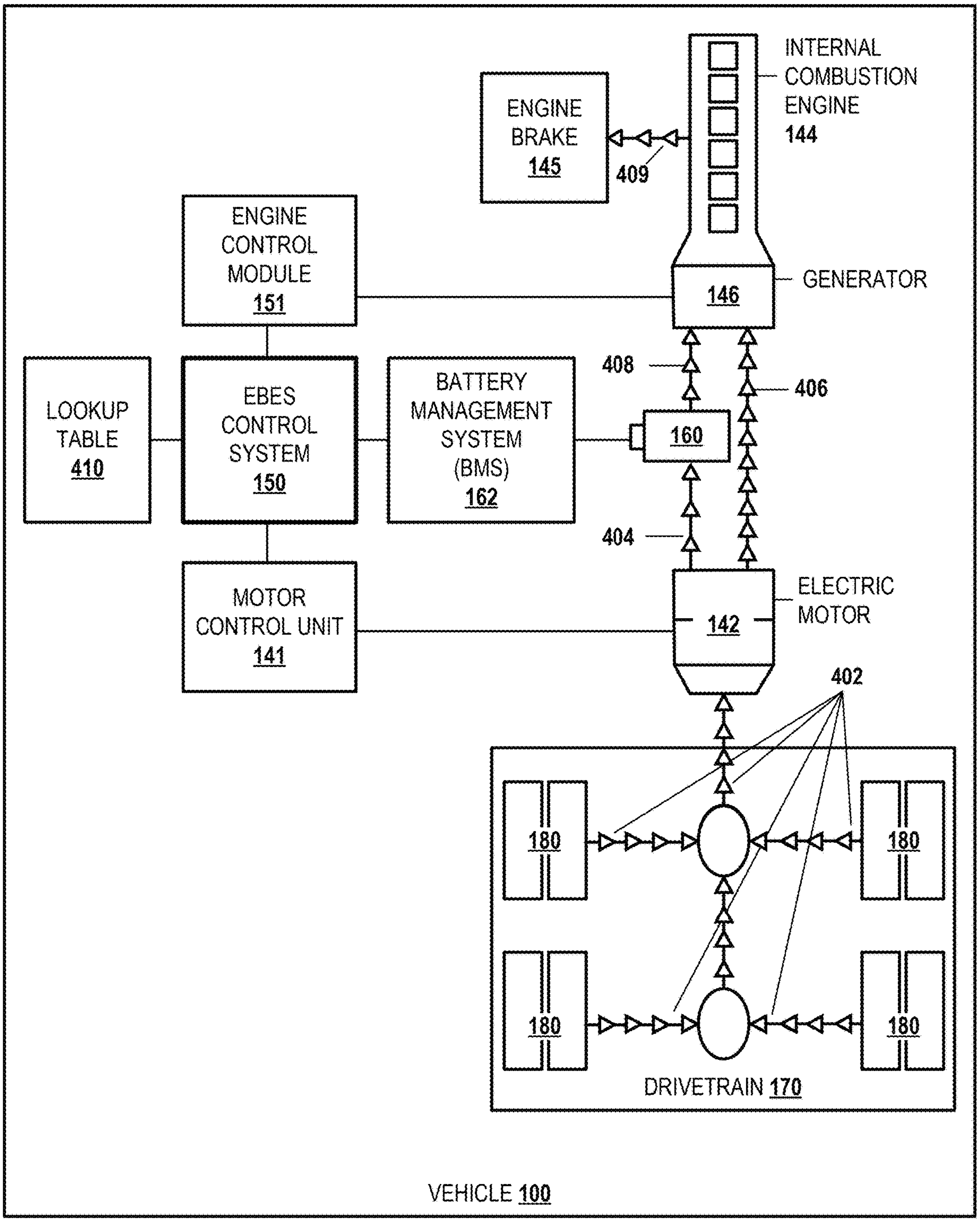
FIG. 4 is a diagram depicting a use case of recovering energy through regenerative braking in response to an indication of a brake request according to an example.

When the battery 160 is able to absorb the energy recovered from regenerative braking and there is no excess recovered energy to manage, the method 300 may proceed to operation 316, where the EBES control system 150 may communicate with the MCU 141 to operate the electric motor 142 as a generator. With reference to and as depicted in FIG. 4, when operating the electric motor 142 in generator/generation mode, the EBES control system 150 may send a command to the MCU 141 to produce an amount of negative torque against rotation of the wheels 180. For instance, the rotating wheels 180 turn the electric motor 142 (indicated by a first set of arrows 402), which converts the kinetic energy of the decelerating vehicle 100 into an electrical energy load. At operation 316, the generated electrical energy load is provided to the battery 160 and stored (operation 318), as indicated by a second set of arrows 404 depicted between the electric motor 142 and the battery 160. The method 300 may return to operation 302.

With reference again to FIG. 3, when a determination is made at decision operation 314 that there is an amount of excess recovered energy that the battery 160 cannot receive, the method 300 may include performing operations 316 and 318 to manage the amount of recovered energy the battery 160 can receive and then continue to operation 320 (as indicated by the broken "YES" connectors) to manage the amount of excess recovered energy that the battery 160 cannot receive. Alternatively, when a determination is made at decision operation 312 that the battery 160 cannot receive any charge, the method 300 may include performing operation 316 and then continuing to operation 320 (as indicated by the thick "NO" connectors) to manage the energy recovered by the electric motor 142 from regenerative braking.

In some examples, at operation 320, the EBES control system 150 uses a lookup table 410 (depicted in FIG. 4) that maps internal combustion engine power to generator speeds to determine a generator speed along a power-speed curve at which a certain power output of the internal combustion engine 144 corresponds to the amount of excess recovered energy. In some examples, the generator 146 is further used to discharge an amount of energy stored in the battery 160, and the determined generator speed corresponds to the amount of excess recovered energy and a desired battery discharge amount.

At operation 322, the EBES control system 150 communicates with the MCU 141 to divert the excess recovered energy that the battery 160 cannot receive to the generator 146 (as indicated by a third set of arrows 406 in FIG. 4). For example, the electric motor 142 or a device electrically connected thereto, may include a switchable connection to both the battery 160 and the generator 146 to selectively divert some or all of the energy produced by the electric motor 142 to the battery 160 and/or the generator 146. In some examples, the EBES control system 150 communicates with the BMS 162 to direct a desired battery discharge amount from the battery 160 to the generator 146 (as indicated by a fourth set of arrows 408 in FIG. 4). That is, the battery 160 may receive all of the charge that it is capable of accepting from electric motor 142 and may direct any additional charge to the generator 146. Additionally, the EBES control system 150 communicates with the ECM 151 to operate the generator 146 in reverse (e.g., from generation mode into motor mode). When in motor mode, the generator 146 receives and consumes the electrical energy load from the electric motor 142 to drive the internal combustion engine 144. In examples, the EBES control system 150 instructs the ECM 151 to operate the generator 146 at the generator speed determined at operation 320.

At operation 324, the EBES control system 150 sends a request to the ECM151 to activate the engine brake 145. The engine brake 145 may be implemented as a compression release brake or an exhaust brake that provides a retarding force against the internal combustion engine 144. For instance, positive torque applied by the generator 146 to the internal combustion engine 144 may be used to drive the internal combustion engine 144 against the engine brake 145, thus sinking the excess energy generated by the electric motor 142 (as indicated by a fifth set of arrows 409 in FIG. 4). According to an aspect, the engine brake 145 can be utilized to continuously absorb and dissipate energy, thus providing an unlimited energy dump for excess regenerative braking energy. Accordingly, regenerative braking torque may be provided as a consistent retarding force, providing a predictable braking experience and minimizing use of the vehicle's service brakes 175 to slow the vehicle 100. In examples, engine brake energy sinking may reduce wear and maintenance of the service brake 175 and service brake components.

In some examples, the EBES control system 150 may determine for an amount of braking torque to be applied by the engine brake 145. For instance, the EBES control system 150 may send a command to the ECM 151 to cause the engine brake 145 to produce an amount of negative torque against rotation of the wheels 180 in addition to the amount of negative torque applied by applying regenerative braking.

Figure 5:
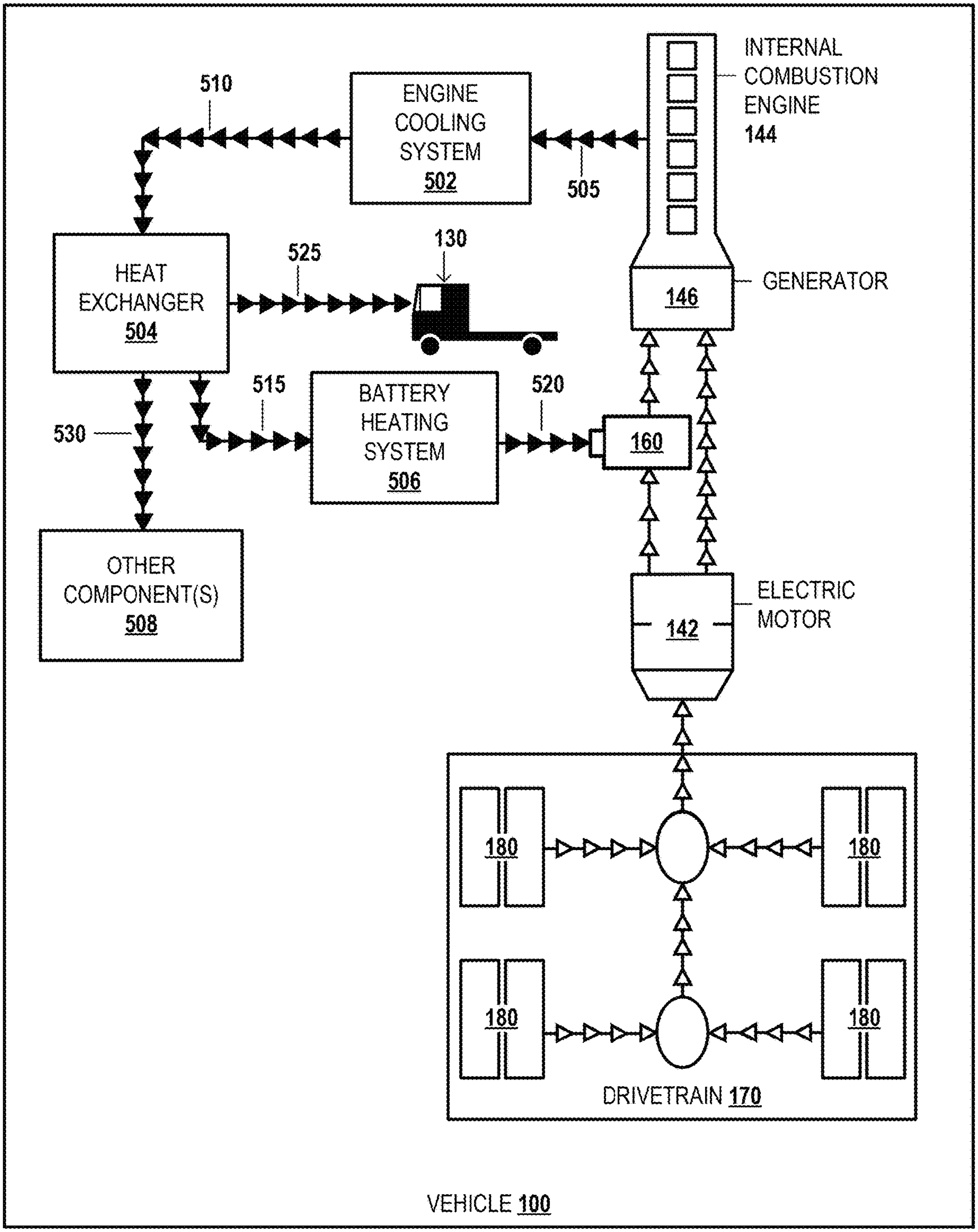
FIG. 5 is a diagram depicting a use case of utilizing heat generated by performing engine brake energy sinking according to an example.

In some implementations, the method 300 includes operation 326, where an engine cooling system 502 and heat exchanger 504 (depicted in FIG. 5) may be implemented to dissipate heat generated from performing engine braking energy sinking. As indicated in FIG. 5 by a first set of arrows 505, heat generated by performing engine braking energy sinking may be dissipated from the internal combustion engine 144 by an engine cooling system 502. In some examples, the engine cooling system 502 circulates a coolant around portions of the internal combustion engine 144 to absorb the heat and release the heat into the environment. In other examples, and as indicated by a second set of arrows 510, the engine cooling system 502 is in communication with one or more heat exchangers 504 that direct the absorbed heat to one or more vehicle components for heating. For instance, and as indicated by a third set of arrows 515, the heat exchanger 504 may be in communication with a battery heating system 506 that warms (indicated by a fourth set of arrows 520) the battery 160 or associated battery components as needed. In other examples, and as indicated by a fifth set of arrows 525, the heat exchanger 504 uses the absorbed heat to warm one or more portions of the cab 130. In yet other examples, and as indicated by a sixth set of arrows 530, the heat exchanger 504 directs the absorbed heat to one or more other vehicle components 508. Thus, managing the excess recovered regenerative braking energy may enhance energy efficiency by reusing the generated heat rather than dissipating it as waste into the environment. In addition, because the engine cooling system 502 is already in place and needed to cool the normal operation of the internal combustion engine 144, the energy sinking of the present systems and methods may be accomplished without the need for additional cooling systems that are required, e.g., by brake resistors. The method 300 may return to operation 302.

Figure 6:
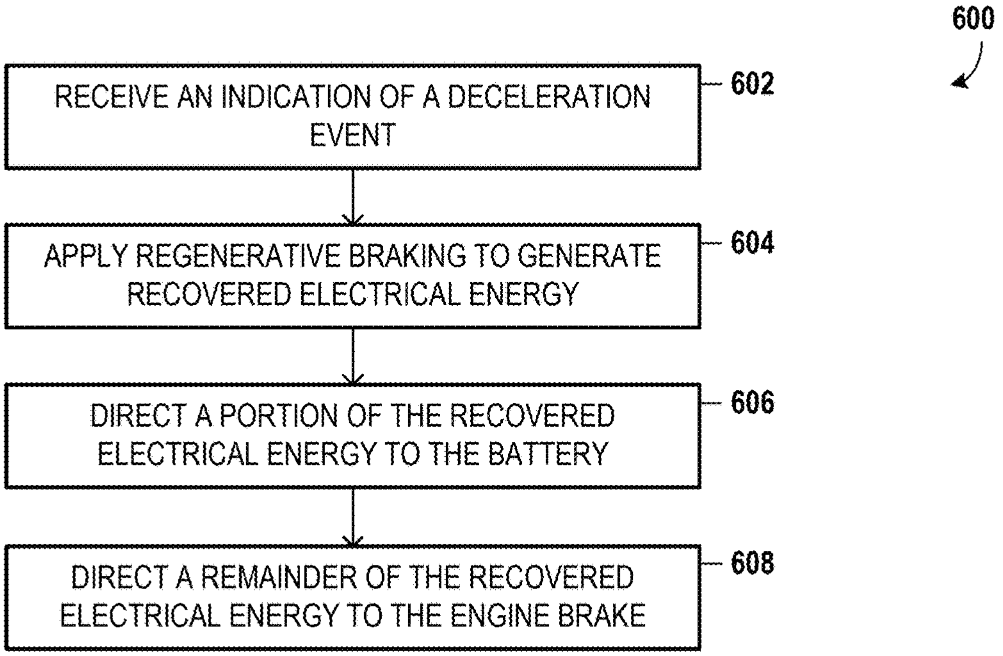
FIG. 6 is a flow diagram of an example method for providing engine brake energy sinking for regenerative braking according to another example.

With reference now to FIG. 6, a flow diagram is depicted including operations of a method 600 for providing engine braking energy sinking according to an example. At operation 602, an indication of a deceleration event (e.g., a brake request) is received. In some examples, the EBES control system 150 receives a signal corresponding to an operator of the vehicle 100 disengaging an accelerator pedal and/or pressing a brake pedal or an automated system (e.g., a cruise control system, autonomous driving system, assisted driving system, or other system or controller) detecting a need to decelerate (e.g., to maintain a target speed, maintain stability, or avoid a collision).

At operation 604, regenerative braking is applied. For instance, the EBES control system 150 may communicate with the MCU 141 to operate the electric motor 142 as a generator, where the electric motor 142 applies negative torque against rotation of the wheels 180 and converts the kinetic energy of the decelerating vehicle 100 into an electrical energy load.

At operation 606, a portion of the electrical energy load generated by the electric motor 142 is directed to the battery 160 for storage and future use. In some implementations, prior to directing the portion of the electrical energy load to the battery 160, an indication is received from the battery 160 that the battery 160 is able to receive a charge.

At operation 608, a remainder of the electrical energy load generated by the electric motor 142 is directed to the engine brake 145 (e.g., implemented as a compression release brake or an exhaust brake) that provides a retarding force against the internal combustion engine 144. For instance, a switchable connection included in the electric motor 142 or a device electrically connected thereto may be controlled to divert the remainder of the electrical energy load generated by the electric motor 142 to the generator 146. Additionally, the generator 146 is operated in reverse (e.g., from generation mode into motor mode), where the generator 146 drives the internal combustion engine 144 using the remainder of the electrical energy load. The generator speed may be determined based on a point along a power-speed curve where a certain power output of the internal combustion engine 144 corresponds to the amount of the remainder of the electrical energy load. Further, the engine brake 145 is activated and the internal combustion engine 144 is operated against the engine brake 145 to sink the remainder of the electrical energy load generated by the electric motor 142.

Figure 7:
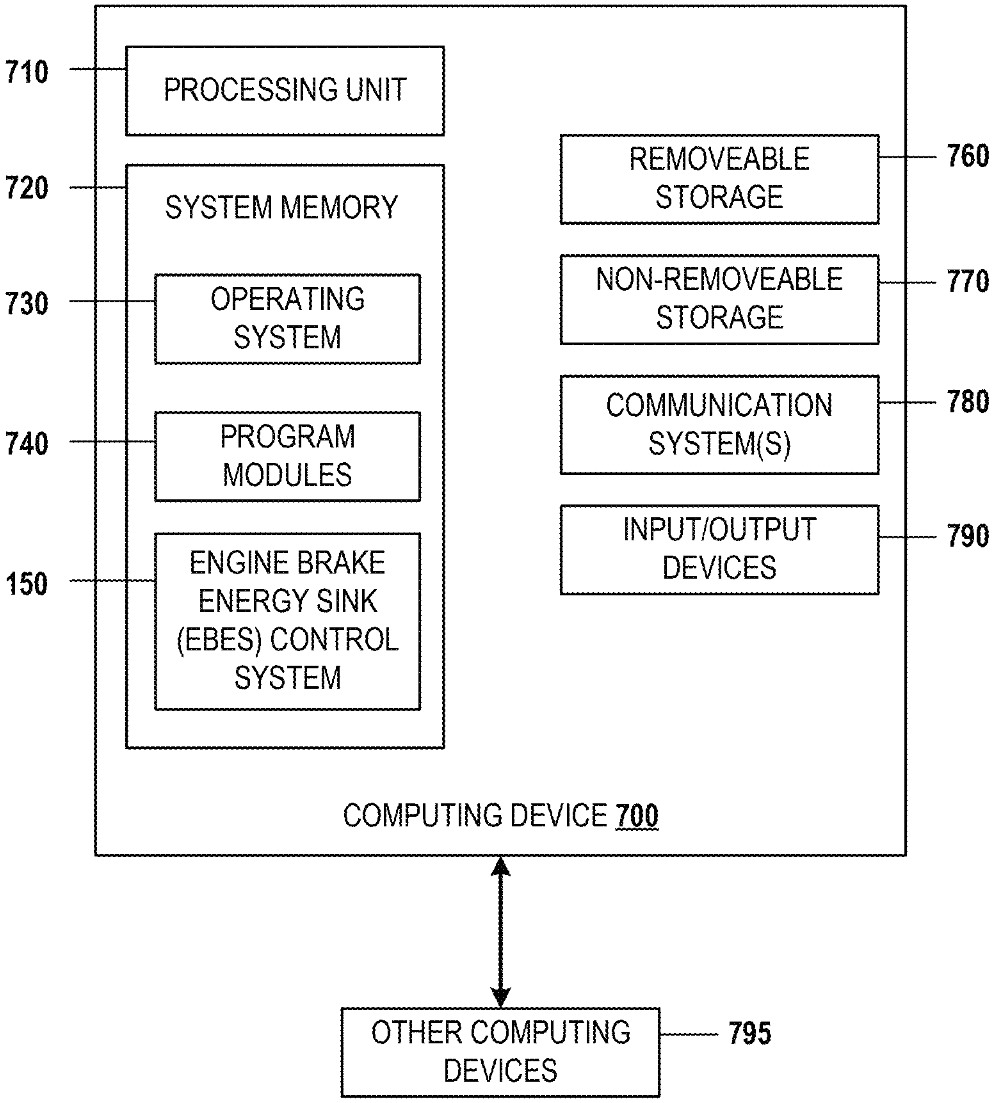
FIG. 7 is a diagram illustrating example physical components of a computing device or system with which examples may be practiced.

FIG. 7 is a system diagram of a computing device 700 according to an example. As shown in FIG. 7, the physical components (e.g., hardware) of the computing device 700 are illustrated and these physical components may be used to practice the various aspects of the present disclosure. The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that controls the operation of the computing device 700 and one or more program modules 740. The program modules 740 may be responsible for performing one more of the operations of the methods described herein for providing engine brake energy sinking for regenerative braking. A number of different program modules and data files may be stored in the system memory 720. While executing on the processing unit 710, the program modules 740 may perform the various processes described above. One example program module 740 includes sufficient computer-executable instructions for the EBES control system 150.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies.

The computing device 700 may include one or more communication systems 780 that enable the computing device 700 to communicate with other computing devices 795 such as, for example, routing engines, gateways, signings systems and the like. Examples of communication systems 780 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 700 may also have one or more input devices and/or one or more output devices shown as input/output devices 790. These input/output devices 790 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 700. Any such computer storage media may be part of the computing device 700. Computer storage media does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A system for providing engine brake energy sinking in a hybrid electric vehicle, comprising:

at least one processing unit; and a memory including instructions, which when executed by the at least one processing unit, cause the system to perform operations comprising:

receiving an indication of a deceleration event;

generating recovered electrical energy by applying regenerative braking;

directing a portion of the recovered electrical energy to a battery; and directing a remainder of the recovered electrical energy to an engine brake, wherein directing the remainder of the recovered electrical energy to the engine brake comprises:

powering an internal combustion engine with the remainder of the electrical energy by running a generator connected to the internal combustion engine in motor mode; and sinking mechanical energy generated by the internal combustion engine by activating the engine brake.

2. The system of claim 1, wherein prior to directing the portion of the recovered electrical energy to the battery, receiving an indication the battery can receive a charge.

3. The system of claim 1, wherein prior to directing the remainder of the recovered electrical energy to the engine brake, receiving an indication the battery is at capacity.

4. A hybrid electric vehicle, comprising:

a rechargeable battery;

a drivetrain;

an electric motor connected to the battery and the drivetrain;

an internal combustion engine, wherein the internal combustion engine includes an engine brake;

a generator, wherein the generator is connected to the rechargeable battery and to the internal combustion engine; and a system for providing energy brake energy sinking, comprising:

at least one processing unit; and a memory including instructions, which when executed by the at least one processing unit, cause the system to perform operations comprising:

receiving an indication of a deceleration event corresponding to a request for braking power;

determining, an amount of negative torque to apply to the drivetrain by the electric motor to slow the hybrid electric vehicle based on the request for braking power;

based on the determined amount of negative torque, determining a corresponding amount of electrical energy recoverable through regenerative braking;

determining an absorption capacity of the battery;

determining, based on a difference between the amount of electrical energy recoverable through regenerative braking and the battery's absorption capacity, an amount of excess recovered electrical energy;

generating the amount of recoverable electrical energy through regenerative braking by running the electric motor in generation mode based on the determined negative torque;

providing the amount of excess recovered electrical energy to the generator; and powering the internal combustion engine with the amount of excess recovered electrical energy by running the generator in motor mode.

5. The hybrid electric vehicle of claim 4, further comprising:

receiving an indication of a selected regenerative braking level; and determining the amount of negative torque to apply to the drivetrain by the electric motor based on selected regenerative braking level.

6. The hybrid electric vehicle of claim 4, wherein the engine brake comprises:

a compression release brake; or an exhaust brake.

7. The hybrid electric vehicle of claim 4, further comprising:

at another time, receiving an indication of low throttle demand;

determining, based on a state of charge of the battery, to charge the battery;

converting mechanical energy generated by the internal combustion engine into electrical energy by running the generator in generation mode; and storing the electrical energy converted from the mechanical energy in the battery.

8. The hybrid electric vehicle of claim 4, wherein running the generator in motor mode comprises:

determining, based on the amount of excess recovered electrical energy and a mapping of generator speeds to power output levels of the internal combustion engine, a generator speed at which to run the generator to consume at least the amount of excess recovered electrical energy; and causing the generator to power the internal combustion engine at the determined generator speed.

9. The hybrid electric vehicle of claim 8, wherein determining the generator speed at which to run the generator further comprises:

determining a discharge amount of electrical energy to discharge from the battery; and determining the generator speed at which to run the generator to consume the amount of excess recovered electrical energy and the discharge amount of electrical energy from the battery.

10. The hybrid electric vehicle of claim 4, further comprising dissipating heat generated by the internal combustion engine and generator using an engine cooling system included in the hybrid electric vehicle.

11. The hybrid electric vehicle of claim 10, further comprising heating a vehicle component by dissipating the heat to the vehicle component using a heat exchanger.

12. The hybrid electric vehicle of claim 4, further comprising:

receiving an indication of a throttle request;

determining an amount of positive torque to apply to the drivetrain by the electric motor to accelerate the hybrid electric vehicle based on the throttle request; and applying the amount of positive torque to the drivetrain by running the electric motor in drive mode powered using electrical energy stored in the battery.

13. The hybrid electric vehicle of claim 12, further comprising:

operating the internal combustion engine; and applying the amount of positive torque to the drivetrain by:

providing mechanical energy generated by the internal combustion engine to the drivetrain to assist in accelerating the hybrid electric vehicle based on the throttle request;

or converting the mechanical energy generated by the internal combustion engine into electrical energy by running the generator in generation mode; and providing the electrical energy converted from the mechanical energy to the electric motor.

14. A method for providing engine braking energy sinking in a hybrid electric vehicle, comprising:

receiving an indication of a deceleration event corresponding to a request for braking power;

determining regenerative braking is on;

determine, an amount of negative torque to apply to a drivetrain by an electric motor to slow the hybrid electric vehicle based on the request for braking power;

based on the determined amount of negative torque, determining a corresponding amount of electrical energy recoverable through regenerative braking;

determining an absorption capacity of a battery;

determining, based on a difference between the amount of electrical energy recoverable through regenerative braking and the battery's absorption capacity, an amount of excess recovered electrical energy;

generating the amount of electrical energy recoverable through regenerative braking by running the electric motor in generation mode based on the determined negative torque;

providing the amount of excess recovered electrical energy to a generator connected to an internal combustion engine including an engine brake;

powering the internal combustion engine with the amount of excess recovered electrical energy by running the generator in motor mode; and sinking mechanical energy generated by the internal combustion engine by activating the engine brake.

15. The method of claim 14, further comprising:

receiving an indication of a selected regenerative braking level; and determining the amount of negative torque to apply to the drivetrain by the electric motor based on selected regenerative braking level.

16. The method of claim 14, further comprising dissipating heat generated by the internal combustion engine and generator using at least one of:

an engine cooling system included in the hybrid electric vehicle; or a heat exchanger connected to a vehicle component.

17. The method of claim 14, wherein activating the engine brake comprises one of:

activating a compression release brake; or activating an exhaust brake.

18. The method of claim 14, wherein running the generator in motor mode comprises:

determining, based on the amount of excess recovered electrical energy and a mapping of generator speeds to power output levels of the internal combustion engine, a generator speed at which to run the generator to consume at least the amount of excess recovered electrical energy; and causing the generator to power the internal combustion engine at the determined generator speed.

19. The method of claim 18, wherein determining the generator speed at which to run the generator further comprises:

determining a discharge amount of electrical energy to discharge from the battery; and determining the generator speed at which to run the generator to consume the amount of excess recovered electrical energy and the discharge amount of electrical energy from the battery.

* * * * *